US006246755B1

(12) United States Patent
Walker et al.

(10) Patent No.: US 6,246,755 B1
(45) Date of Patent: *Jun. 12, 2001

(54) METHOD AND SYSTEM FOR CONNECTING A CALLER TO A CONTENT PROVIDER

(75) Inventors: Jay S. Walker, Ridgefield, CT (US); Gregory G. Carson, Londonberry, NH (US); T. Scott Case, Darien; James A. Jorasch, Stamford, both of CT (US)

(73) Assignee: Walker Digital, LLC, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,802

(22) Filed: Dec. 31, 1996

(51) Int. Cl.[7] .................. H04M 15/00; H04M 11/00; G06K 6/00

(52) U.S. Cl. ............... 379/115; 379/119; 379/91.01; 235/380; 235/381

(58) Field of Search ................ 379/111–121, 127, 379/144, 91.01, 91.02; 238/379, 380, 381, 437, 382; 340/825.34, 825.33

(56) References Cited

U.S. PATENT DOCUMENTS

| 4,706,275 | 11/1987 | Kamil ................................ 379/144 |
| 4,893,330 | 1/1990 | Franco ............................... 379/91 |
| 4,975,942 | 12/1990 | Zebryk ............................. 379/144 |
| 5,003,584 | * 3/1991 | Benyacar et al. .................. 379/119 |
| 5,146,491 | 9/1992 | Silver et al. ...................... 379/114 |
| 5,148,474 | * 9/1992 | Haralambopoulos et al. ...... 379/111 |
| 5,163,086 | 11/1992 | Ahearn et al. ..................... 379/91 |
| 5,204,894 | 4/1993 | Darden .............................. 379/88 |
| 5,222,121 | 6/1993 | Shimada ............................ 379/88 |
| 5,249,219 | 9/1993 | Morganstein et al. ............. 379/84 |
| 5,287,403 | 2/1994 | Atkins et al. ..................... 379/144 |
| 5,353,335 | 10/1994 | D'Urso et al. ..................... 379/67 |
| 5,359,642 | 10/1994 | Castro ............................... 379/121 |
| 5,469,497 | 11/1995 | Pierce et al. ..................... 379/115 |
| 5,513,117 | 4/1996 | Small ................................ 364/479 |
| 5,537,464 | * 7/1996 | Lewis et al. ...................... 379/115 |
| 5,546,446 | 8/1996 | Tsunokawa et al. ............... 379/114 |
| 5,577,109 | 11/1996 | Stimson et al. ................... 379/112 |
| 5,592,537 | 1/1997 | Moen ................................ 379/67 |
| 5,621,787 | * 4/1997 | McKoy et al. .................... 379/144 |
| 5,715,298 | * 2/1998 | Rogers ............................. 379/91.01 |

OTHER PUBLICATIONS

Liz Pulliam, "College Students May Learn the hardest Accounting Lessons Outside the Classroom", Orange County Register, Sep. 1, 1996, at p. K01.
"Kids' Phone Usage Another Way for Marketers to Get Connected", Phillips Business Information, Inc., Selling to Kids, Jan. 22, 1997.
Pending U.S. patent application Appln. No. 08/570,443, entitled "Prepaid Limited Usage Calling Card", filed in the name of Jay S. Walker on Dec. 11, 1995.
Web Site: "College Talk" (http://WWW.adforce.com/video/ctalk.html).

* cited by examiner

Primary Examiner—Duc Nguyen
(74) Attorney, Agent, or Firm—Dean P. Alderucci

(57) ABSTRACT

The invention relates to methods and systems for connecting a caller to a content provider who provides a service to the caller over the telephone system. In accordance with the invention, a caller establishes a prepaid account with an intermediary, termed a transaction processor. When the caller wishes to access a content provider, the caller makes a telephone call to the transaction processor providing access to a plurality of content providers via a common access number. The caller identifies his prepaid account and the desired content provider. The transaction processor connects the caller to the content provider, monitors the connection between the caller and the content provider, and debits the caller's prepaid account according to the service provided by the content provider.

44 Claims, 8 Drawing Sheets

METHOD AND SYSTEM FOR CONNECTING A CALLER TO A CONTENT PROVIDER

FIELD OF THE INVENTION

The present invention relates generally to methods and systems for allowing callers to access content providers, such as 900 and 976 numbers, over a telephone network. More particularly, the invention relates to prepaying for services supplied by such providers and accessing the services through an intermediary who has access to the prepaid accounts.

BACKGROUND

With the advent of 900 number and similar shared-revenue systems, the use of telephone-based services and the corresponding number of providers of these services has increased dramatically. Consumers can now use the telephone to receive a wide variety of services, ranging from technical support to personal psychic readings. These services are typically provided by a content provider who first delivers the service over the telephone and subsequently bills the caller. The caller typically is identified by the phone number from which he is calling, with the subsequent bill then included as part of the caller's regular telephone bill. The content provider typically calculates the amount of the bill after the service has been delivered. This amount is forwarded to the telephone company, which both bills and collects from the caller. The telephone company typically deducts a portion of the total bill in return for both the cost of making the telephone connection and for the telephone company's role as bill collector.

This system has significant drawbacks. For example, since the caller is charged after he has consumed the service, there is a significant risk of bad debt. Callers may refuse to pay for the service or may even deny having used the service in the first place. This often results in a loss to the content provider and also requires the telephone company to charge a higher rate for the telephone connection since a fraction of the connections will be written off as bad debt. Another disadvantage is that calls from public access phones, such as those in airports and hotels, are typically blocked since it is unclear who should be billed for calls from these phones. Many companies also block calls from their internal phones to prevent employees from, among other reasons, generating large bills. Another disadvantage is that callers from home cannot access a service anonymously since telephone billing statements normally identify both the content provider called and the amount charged.

In an effort to overcome some of these disadvantages, some content providers have established 900 number debit cards in which the caller prepays for the service provided by the content provider. For example, a 900 number debit card was offered by the Weather Channel. In this system, the caller set up an account by purchasing the debit card, effectively prepaying for Weather Channel access/information. The caller then dialed the access number on the back of the debit card to access the Weather Channel, with the appropriate fee being deducted from the value remaining in the caller's prepaid account. However, the Weather Channel debit card could only complete calls to the Weather Channel; services from other content providers were not available through the Weather Channel debit card. This single service limitation severely limits the functionality of a debit card, as a caller would have to carry a separate card and maintain a separate prepaid account for each content provider he intends to access.

At the other extreme, many vendors sell prepaid calling cards for telephone calls at a fixed or standard rate. Such cards may allow, for example, the caller to call anywhere in the U.S. at any time for 16 cents/minute, with a correspondingly higher rate for foreign calls. Although such prepaid cards have no called-number restrictions, they are oriented toward pure telephony, rather than content access. That is, every call made is charged at the same rate regardless of the number being called, and this rate is set by the prepaid card provider rather than by the number being called. Telephony systems of the type maintaining prepaid accounts at a central computer are disclosed in U.S. Pat. Nos. 4,706,275, 5,359,642 and 5,469,497.

Thus, there is a need for systems and methods which allow a caller to access different content providers, each having a particular rate different from the standard rate for telephone connectivity, while simultaneously reducing the instances of bad debt, increasing the access from public and other normally blocked telephone lines, allowing the caller to anonymously access a service, and/or reducing the high cost of telephone connections for such services.

SUMMARY OF THE INVENTION

In connection with the foregoing, a transaction processor (e.g., debit card platform) in accordance with the invention includes two communications ports, a telephone switch coupling the two communications ports, and a control logic. In a method using this system, the first communications port receives a telephone call from a caller, who identifies one of many content providers which he would like to access, and the second communication port makes a telephone connection to the identified content provider. The control logic configures the telephone switch to connect the caller on the first communications port to the content provider on the second communications port, thus allowing the content provider to provide a service to the caller. The control logic also debits a prepaid account associated with the caller for the service.

One aspect of the invention includes a prepaid account database coupled to the control logic. The prepaid account database associates caller identifying codes, such as personal identification numbers (PINs), with prepaid accounts. When a caller supplies his caller identifying code, the control logic accesses the prepaid account database to identify the corresponding prepaid account.

Another aspect of the invention includes a content provider database coupled to the control logic. The content provider database associates content providers with costs for their services. When a caller accesses a content provider, the control logic accesses the content provider database to calculate an amount to be debited to the caller's prepaid account based specifically on the service provided and the identified content provider.

Yet another aspect of the invention concerns crediting a caller's prepaid account in response to receiving a payment from a caller.

The system and method of the invention will be more readily understood and apparent from the following detailed description of the invention, which should be read in conjunction with the accompanying drawings, and from the claims which are appended at the end of the detailed description.

DETAILED DESCRIPTION OF THE INVENTION

System Overview

Figure 1:
FIG. 1 is a block diagram of a system in accordance with one embodiment of the invention.

FIG. 1 shows a preferred embodiment of a system in accordance with the present invention, which connects a caller 110 to a content provider 120 over a telephone network 160 via a transaction processor (e.g., debit card platform) 200.

Content provider 120, as used herein, includes parties which provide information and/or a service over the telephone network 160 and which charge specifically for that service. This includes parties which traditionally have provided services over the telephone network 160 via 900, 976 and other shared-revenue numbers. Of course, such services could include the sale of goods, in which case the content would be a catalog of goods offered for sale. Therefore, as used in the specification and claims, the terms "content" and "service" shall be understood to include any tangible or intangible quantity provided to the caller. Finally, these services, telephone numbers, and content providers may be referred to as shared-revenue services, shared-revenue numbers, and shared-revenue content providers, respectively, in the sense that they charge a premium in addition to the transport costs of the basic telecommunications services, the total access charges typically being shared amongst the content provider, the transaction processor, and the telecommunications service(s).

The telephone network 160, as used herein, includes the combination of local and long distance wire facilities and switches generally known as the public switched telephone network ("PSTN"). However, telephone network 160 is not restricted to the PSTN, but could also include wireless networks, cellular telephone networks, the telephone capability of the Internet, and other non-telephonic communications facilities through which content or services may be provided.

Figure 2:
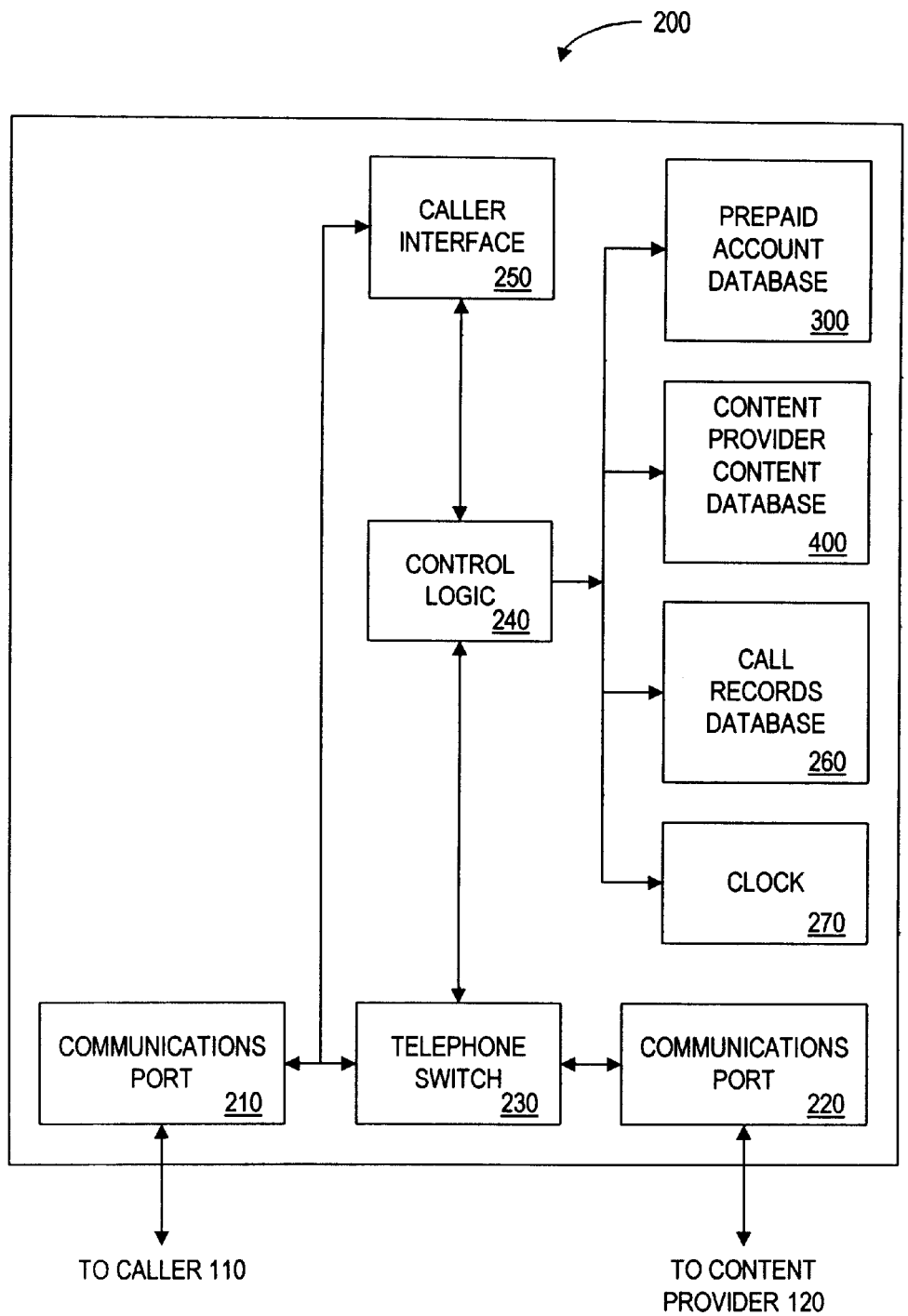
FIG. 2 is a block diagram of the transaction processor of FIG. 1.

FIG. 2 shows a preferred embodiment of the transaction processor 200, which is at the heart of the invention. As the description below will show, the information needed by the caller to use the system can conveniently be inscribed on a "debit card"; however, the invention is not restricted to use with such debit cards, and the invention should be understood to include any system having the functionality described herein, whether used in conjunction with debit cards or other access devices.

Communications ports 210 and 220 are coupled to each other via a telephone switch 230, which is controlled by control logic 240. Control logic 240 is also coupled to communications port 210 (and hence to the caller 110) through caller interface 250. The communications ports 210 and 220 include multiple communications channels for simultaneously connecting multiple callers 110 to multiple content providers 120. In one embodiment of the invention, the communications ports 210 and 220 may be stand-alone devices. Alternatively, the communications ports 210 and 220 may be integrated within the telephone switch 230 into a single device.

The telephone switch 230 and control logic 240 may be implemented as two separate devices. For example, the telephone switch 230 might be a conventional switch such as the Excel LNX 2000 while the control logic 230 might be an off-the-shelf microprocessor. Alternatively, the telephone switch 230 and control logic 240 may be implemented in a single device, such as the AT&T System 8511.

The caller interface 250 resides between the communication port 210 and the control logic 240. In a preferred embodiment, the caller interface 250 includes an interactive voice response unit ("IVRU"). The IVRU facilitates communications between the caller 110 connected to a communications port 210 and the control logic 240 by converting dual tone multi-frequency ("DTMF") tones entered by the caller 110 on his touch tone key pad into digital signals for the control logic 240 and by responsively playing various messages selected by the control logic 240 to the caller 110.

The control logic 240 is also connected to a prepaid account database 300, a content provider database 400, a call records database 260, and a clock 270. The term database as used herein refers to data records generally and is not meant to imply any specific data structure.

Figure 3:
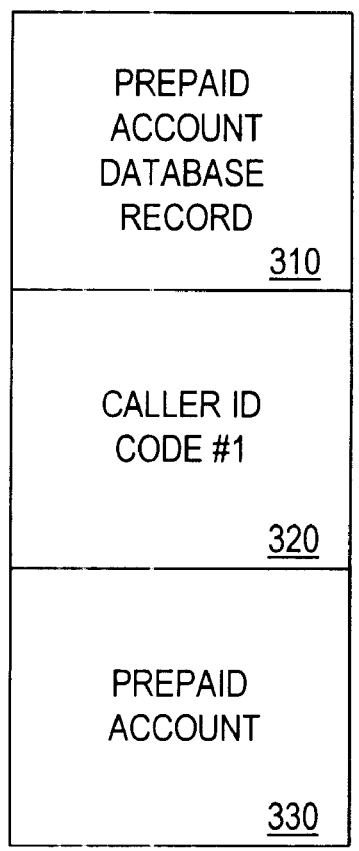
FIG. 3 is a block diagram of the prepaid account database of FIG. 2.

The prepaid account database 300 tracks the prepaid accounts of the callers 110. As shown in FIG. 3, prepaid account database 300 contains a number of records 310, each of which associates a caller identifying code 320 with a prepaid account 330, including the current balance information for the accounts. In a preferred embodiment, the caller identifying code 320 is a numeric identification number which may be printed on a card carried by the caller 10.

Figure 4:
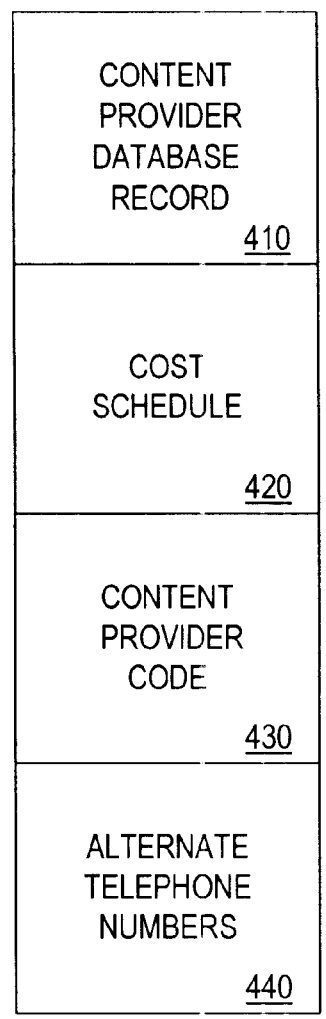
FIG. 4 is a block diagram of the content provider database of FIG. 2.

In a similar manner, the content provider database 400 tracks content providers 120. As shown in FIG. 4, the content provider database 400 contains a number of records 410, each of which associates a content provider with his cost schedule 420. The cost schedule 420 may typically have both a fixed component and/or a variable component.

Each record 410 may also associate the content provider with a corresponding content provider code 430. In one embodiment of the invention, the code 430 might be a content provider's phone number, e.g, a 900 number. In a related embodiment, the content provider record 410 might also include other phone numbers 440 associated with the content provider. Continuing the previous example, the caller might identify a content provider by his 900 number, which the content provider database 400 would translate to a corresponding direct dial number. The transaction processor 200 would then actually be connected to the content provider 120 via the looked-up direct dial number rather than the inputted 900 number.

Returning now to FIG. 2, the call records database 260 stores records of the telephone calls and connections made and/or received by the transaction processor 200. For example, such records might include the date, time, and duration of a phone call made to a content provider in order to verify bills subsequently received from the content provider. Similarly, the call records database 260 may also store records of phone calls received from callers in order to resolve any later disputes regarding the charges made to a caller's prepaid account. The clock 270 may be used by the control logic 240 to provide call date, time and duration information for these records.

Method Of Operation

In a preferred embodiment of a method for operating the system depicted in FIGS. 1–4, a caller 110 wishes to access a service provided by a content provider 120. To do so, the caller 110 first purchases a prepaid debit card, for example from an intermediary vendor. The debit card has associated therewith an account usable by the holder of the card. Alternatively, the caller 110 may contact the operator of transaction processor 200 directly to establish an account. The caller 110 then makes a telephone call to the transaction processor 200 over the telephone network 160. The transaction processor 200, which can make telephone calls to a number of content providers, makes a telephone call to the content provider 120 identified by the caller 110, also over the telephone network 160. The transaction processor 200 then connects the two telephone calls, resulting in a telephone connection from the caller 110 to the content provider 120 via the transaction processor 200. The content provider 120 then provides the service to the caller 110 over the telephone connection, and the transaction processor 200 charges the cost of the service to the caller 110's prepaid account. The content provider 120 receives its payment for the service provided from the transaction processor 200.

Figure 5A:
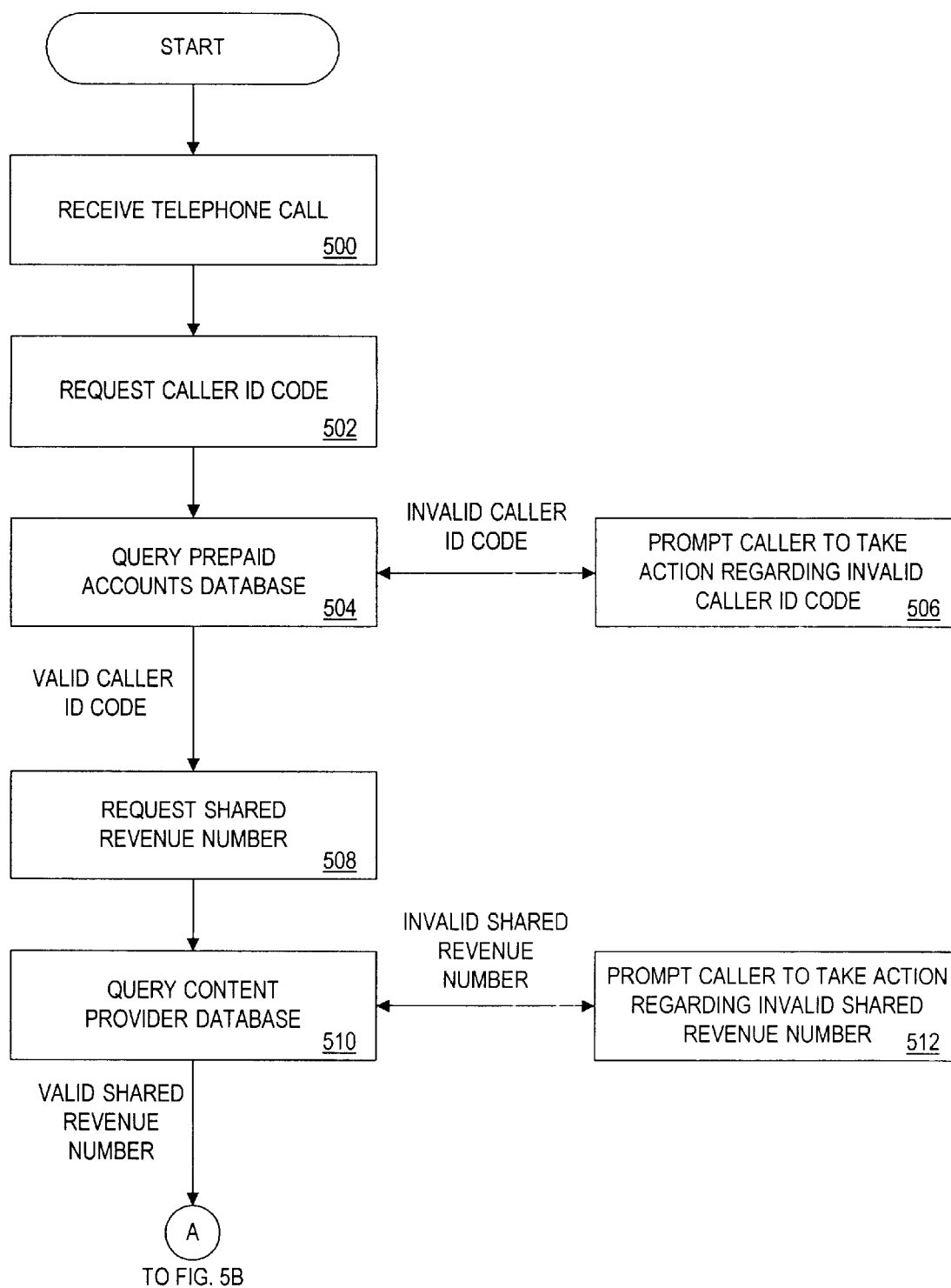
FIGS. 5A, 5B and 5C are a flow diagram illustrating the operation of the system depicted in FIGS. 1 to 4 in accordance with one embodiment of the invention.
Figure 5B:
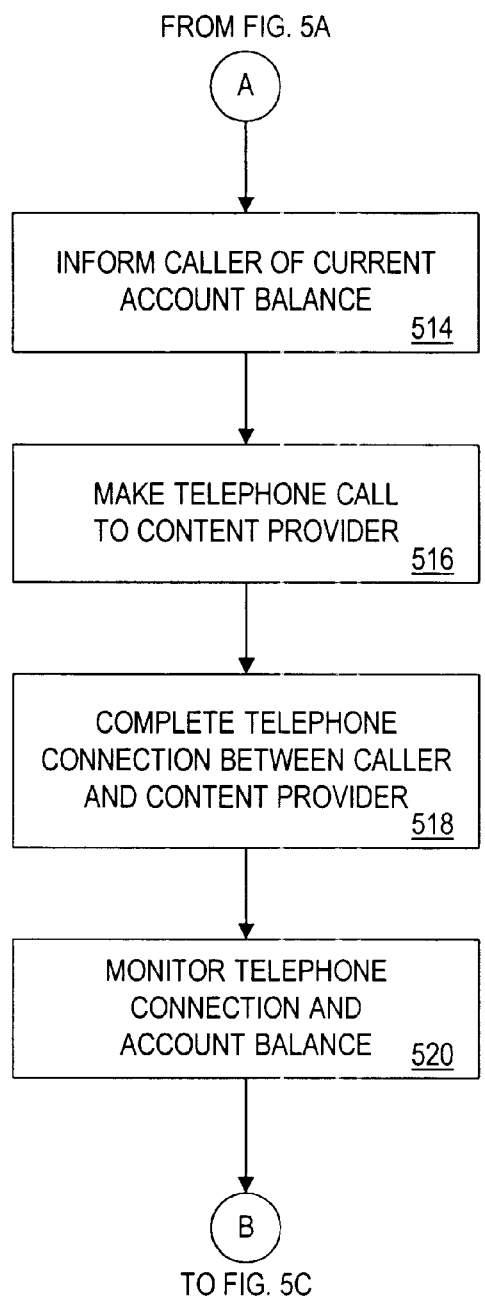
Figure 5C:
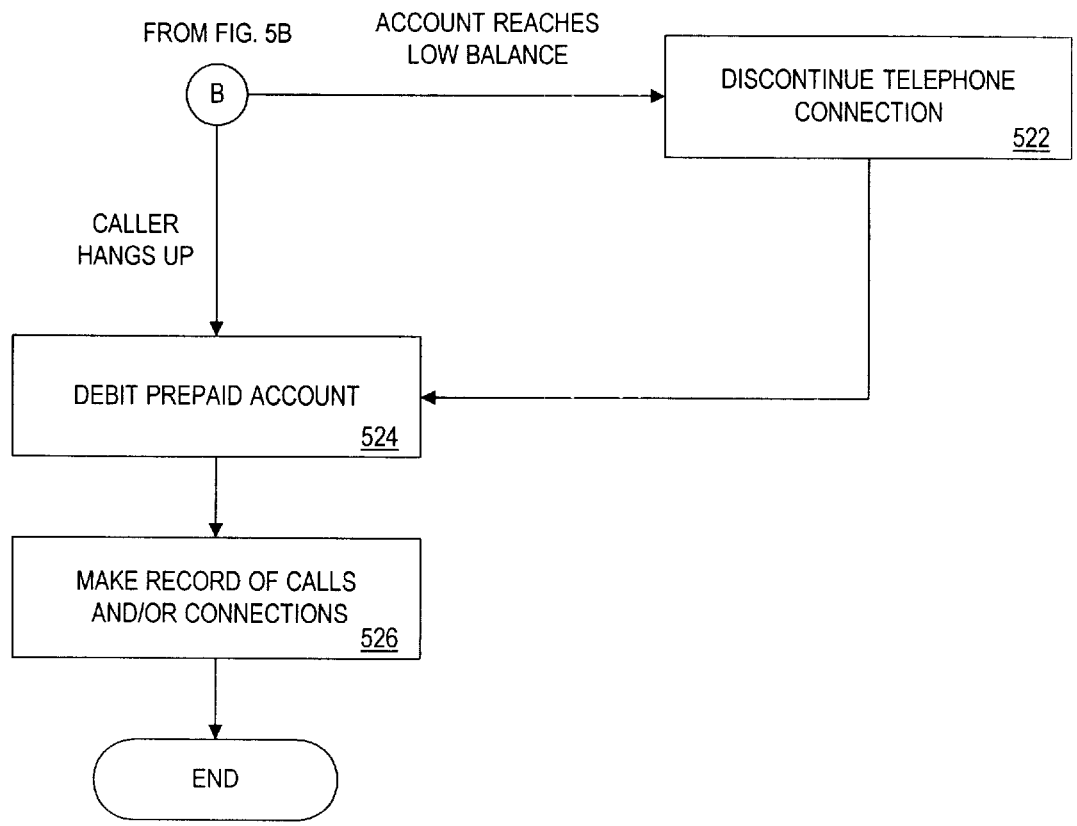

The detailed operation of the system will now be described in greater detail with respect to FIG. 5. At step 500, the transaction processor 200 receives a telephone call from the caller 110. The telephone call identifies a prepaid account 330 associated with the caller 110 and a content provider 120 which the caller 110 wishes to access.

In a preferred embodiment of the invention, the incoming telephone call is a toll-free call, such as an 800 or 888 number call. The use of toll-free numbers presents numerous advantages over other types of telephone calls. For example, current F.C.C. regulations dictate that toll-free numbers cannot be blocked, thus allowing access to the transaction processor 200 and content provider 120 from any telephone in the U.S. The toll-free number is also advantageous for the caller 110, who can conveniently place the call from any telephone with no record of the call appearing on his regular telephone bill. Although toll-free calls are preferred because of the above advantages, they are not required for the invention. For example, the telephone call could be a collect call, or a direct dialed call paid for by the caller 110.

In the preferred embodiment, the prepaid account 330 is identified as follows. Recall from FIG. 2 that the caller interface 250 of the transaction processor 200 is an IVRU under the control of the control logic 240. Referring now to FIG. 5, after the caller 110 calls the transaction processor 200 at step 500, the IVRU requests the caller 110's caller identifying code 320 at step 502. The caller 110 enters his caller identifying code 320 via his telephone keypad and the IVRU converts the DTMF tones to digital signals for the control logic 240. At step 504, the control logic 240 queries the prepaid account database 300 for the validity of the caller identifying code 320 and the current balance of the corresponding prepaid account 330. At step 506, if the caller identifying code 320 is not valid or if the current balance is too low, the IVRU prompts the caller 110 to take appropriate action, e.g., reentering the caller identifying code 320, disconnecting, or making a payment to the transaction processor 200 to recharge the prepaid account 330. If the caller identifying code 320 is valid and has a sufficient balance, the caller 110 may access a content provider 120.

In a preferred embodiment of the present invention, the content providers 120 are shared-revenue content providers that are normally directly accessed via the shared-revenue network, including 900, 976, and similar numbers. These numbers serve as content provider codes 430 for content providers accessed via the 800 or 888 number transaction processor of the present invention. Alternatively, other methods of identifying content providers may be readily used, for example names or other unique identifiers. Such a unique identifier may be included as an additional field in content provider database 400 and accessed by control logic 240. At step 508, the IVRU requests the caller 110 to identify the desired content provider 120, selecting amongst the plurality of content providers 120 accessible by the caller 110 by entering its shared-revenue (e.g., 900 or 976) telephone number via the caller's telephone keypad. Alternatively, transaction processor 200 may provide the caller 110 with a listing of content providers 120 amongst which the caller may select. Such a listing may be provided, for example, in writing on the back of the debit card, on promotional literature, or through the IVRU upon each access by caller 110 to transaction processor 200. The use of such listings illustrates that the content providers may be identified and selected by other identifiers, such as by name or number (unrelated to the telephone number). Or, in an embodiment combining the shared-revenue number and some other identifier, the caller could identify and select the content provider by the former, then a logic device could determine the latter via a table lookup. Transaction processor 200 may additionally offer samplings or further information relating to the services of each of content providers 120, permitting the caller 110 to make a more informed decision from amongst the providers. At step 510, the control logic 240 queries the content provider database 400 for the validity of the shared-revenue number 430 and the associated cost schedule 420, which is typically a predetermined cost per minute for connection to the shared-revenue number. Of course, the cost could also be a fixed amount (e.g., in the case of goods sold over the telephone), a per quantity charge (e.g., in the case of metered content sales), or any other charge appropriate to a particular sales mode. The flexibility afforded by such a cost schedule 420 also allows the transaction processor 200 to calculate the cost incurred by the caller 110 as the service is provided, rather than after the caller 110 completes his telephone connection. At step 512, if the shared-revenue number 430 is not valid, the IVRU prompts the caller 110 to enter a different shared-revenue number or to disconnect from the system. At step 514, if the shared-revenue number 430 is valid, the control logic 240 informs the caller 110 of the current balance in his prepaid account 330, by having the IVRU announce either the actual balance or the maximum extent of the service (e.g., connect time) to the shared-revenue number 430.

The transaction processor 200 then completes the telephone connection from the caller 110 to the content provider 120. At step 516, the transaction processor 200 makes a telephone call to the content provider 120, using either the shared-revenue number 430 provided by the caller 110 or an alternate phone number 440. For example, in the current telephone system, corresponding to each shared-revenue number 430 is an underlying direct dial number 440. At step 518, the transaction processor 200 then completes the telephone connection from the caller 110 to the content provider 120 by configuring the telephone switch 230 of FIG. 2 to connect the telephone call from the caller 110 to the telephone call to the content provider 120.

Calling a direct dial number 440, rather than the shared-revenue number 430, has several advantages. For example, use of the direct dial number 440 eliminates the surcharges and overhead amounts charged by the telephone company, offering increased revenue for both the transaction processor 200 and the content provider 120. If the transaction processor 200 is billed directly by the content provider 120, then the telephone company's billing and collection charges for premium services may also be avoided. The direct billing can also result in faster payment for the content provider 120 since the telephone company collection process is avoided, as are holdbacks for bad debt. As used herein, the term "telephone company" includes entities which make the telephone connections, those which bill for the connections, and those which perform both functions.

Furthermore, if the shared-revenue number 430 is used, the content provider 120 will bill the transaction processor 200 according to the pricing schedule for the shared-revenue number 430. However, if the direct dial number 440 is used, a different pricing schedule can be applied. In a preferred direct dial embodiment, the transaction processor 200 has a pre-existing arrangement with the content provider 120, including a predetermined pricing schedule for the direct dial number 440. Essentially, the transaction processor 200 agrees to allow the content provider 120 to register his service in the content provider database 410. In return, the content provider 120 provides cost schedules 420, possibly with significant discounts, and a direct dial phone number 440 avoids telephone company charges otherwise incurred through the use of a premium telephone number. The net result is a transfer of revenue, which would otherwise by allotted to the phone company, to the transaction processor 200 and the content provider 120. The new pricing schedule may also allow the caller 110 to realize a portion of the reduction in phone company revenues.

At step 520, after the telephone connection is made, the control logic 240 monitors the telephone connection and the balance remaining in the prepaid account 330. Using the content provider's cost schedule 420 and the duration of the telephone connection, the control logic 240 continuously checks whether the balance remaining in the caller 110's prepaid account 330 is too low to continue the connection. If so, at step 522, the control logic 240 discontinues the telephone connection. As an alternative to terminating telephone service when prepaid account 330 drops below a predetermined amount, transaction processor 200 may connect the caller to a live operator, or IVRU, which can permit the caller to increase the account balance through a credit card charge. This will permit the caller to continue accessing the content provider with minimal interruption. Eventually, the call ends either voluntarily or involuntarily. In either case, at step 524, the control logic 240 calculates the cost of the telephone connection based on the cost schedule 420 and the duration of the telephone connection and debits the prepaid account 330 accordingly. At step 526, the control logic 240 may also record the telephone connections and calls made and received in the call records database 260 of FIG. 2. The call records database 260 may be used later to settle billing disputes with either the caller 110 or the content provider 120.

Figure 6:
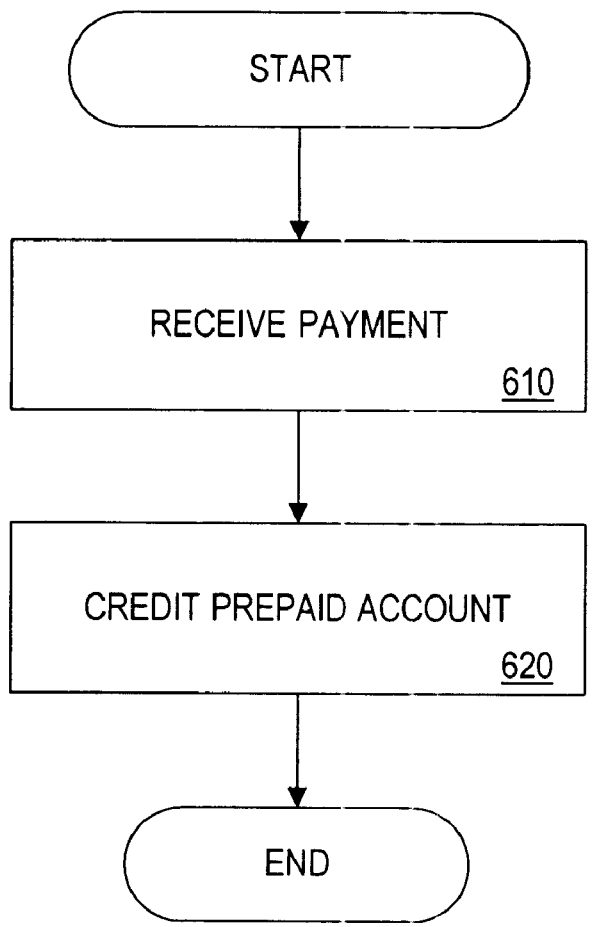
FIG. 6 is a flow diagram illustrating another aspect of operation of the system depicted in FIGS. 1 to 4.

FIG. 6 shows a method for crediting a prepaid account 330, which is typically done by the caller to establish or replenish the account value. At step 610, the transaction processor 200 receives a payment from the caller 110 or a party acting on the caller's behalf. In one embodiment, the caller 110 may pay an intermediary who then pays the transaction processor 200, rather than paying the transaction processor 200 directly. In any event, the payment is associated with a particular prepaid account 330. At step 620, the transaction processor 200 then credits the prepaid account 330 accordingly. The process of receiving a call, accepting a caller's ID code, and determining the corresponding prepaid account 330 can be performed exactly as described previously with respect to accessing a content provider. The control logic 240 would, of course, have added IVRU prompts to receive a credit card number, EFT authorization, telephone number billing information, or other payment mechanisms, as well as links to well-known account verification/funds sufficiency/payment processing services, necessary to complete the transaction. As will be appreciated by one skilled in the art, such functionality can even be implemented as an option, following step 520 of FIG. 5, whereby the caller can add funds rather than being disconnected from an ongoing call upon reaching a low balance limit.

As the foregoing show, since account balances are stored at the central (remote) transaction processor, a caller of the system need only possess a minimum of information to use the invention. Such information may be recorded on a traditional wallet sized, paper or plastic debit card on which is inscribed the telephone number of the transaction processor, the caller's PIN code, codes for various content providers, instructions on using the transaction processor, and any other necessary information. In its traditional form, the card serves primarily as a reference device for the caller and would not be required if the caller memorized the information recorded on the card. Thus, the card is not a necessary piece of the system and is not necessary to use the system.

For example, in more sophisticated embodiments, the debit card could be what is generally described as a "smart" card. Such a "smart" debit card may have an account balance stored on the card and may even be capable of generating DTMF tones to complete a call. That is, part of the transaction processor 200 may be implemented on the debit card itself. Similarly, the prepaid account database 300 could even be distributed among the debit cards of the callers. The foregoing example also illustrates that the transaction processor may be implemented across multiple computers or in a distributed computing environment. Alternatively, sets of transaction processors may be dispersed across a region, each platform servicing a local area within the region.

Finally, although the system disclosed herein allows any caller with a valid caller identifying code to access any valid shared-revenue number, it will be apparent to those of ordinary skill in the art that access restrictions are easily implementable. For example, certain callers might be limited to a subset of the available shared-revenue numbers. Thus, a company providing prepaid accounts to its employees for the purpose of software support might limit access to only those shared-revenue numbers which actually provide software support. Alternately, the transaction processor may group together all shared-revenue numbers having the same cost schedule and then offer prepaid accounts tied to the specific cost schedule. Callers could then select from a menu of available shared-revenue numbers, all of which charge the same price. The transaction processor could implement these and other variations by adding additional fields to the prepaid account database 300 and/or the content provider database 400.

Although the present invention has been described in terms of particular embodiments, it will be appreciated that various modifications and alterations thereto may be made without departing from the spirit and scope of the invention. Therefore, it is intended that the scope of the invention be limited only by the following claims.

What is claimed is:

1. A system for allowing a caller to access a content provider, comprising:
   (a) a first communications port for receiving a telephone call from a caller;
   (b) a second communications port for making a telephone connection to one of a plurality of content providers identified by the caller;

(c) a telephone switch coupled to the first and second communications ports; and (d) a control logic coupled to the first communications port and controlling the telephone switch, the control logic adapted to: (i) configure the telephone switch to make a telephone connection between the caller and the identified content provider, and to (ii) debit a prepaid account associated with the caller for a service provided by the content provider based on the service and on the identified content provider.

2. The system of claim 1 wherein the first communications port is adapted to receive a toll-free telephone call from the caller.

3. The system of claim 1 further comprising a caller interface coupled to the first communications port and the control logic.

4. The system of claim 3 wherein the caller interface includes an interactive voice response unit.

5. The system of claim 4 wherein the interactive voice response unit is adapted to announce a current balance of the prepaid account.

6. The system of claim 4 wherein the interactive voice response unit is adapted to announce a maximum duration of the telephone connection between the caller and the content provider.

7. The system of claim 1 further comprising a prepaid account database coupled to the control logic, the prepaid account database identifying a plurality of caller identifying codes and a prepaid account associated with each caller identifying code, and wherein the control logic is configured to access the prepaid account database to identify the prepaid account associated with a caller identifying code supplied by the caller.

8. The system of claim 7 wherein the control logic is programmed to configure the telephone switch for the connection if a balance in the prepaid account is above a predetermined value.

9. The system of claim 7 wherein the control logic is adapted to discontinue the telephone connection between the caller and the content provider when, based on the cost for the service and a duration of the telephone connection, a balance in the prepaid account falls below a predetermined value.

10. The system of claim 1 further comprising a content provider database coupled to the control logic, the content provider database identifying a plurality of content providers and a cost for a service provided by each content provider, and wherein the control logic is configured to access the content provider database to calculate an amount to be debited to the prepaid account.

11. The system of claim 1 further comprising a call records database coupled to the control logic, the call records database including a record of the telephone connections made.

12. A method for allowing a caller to access a service offered by a content provider, the method comprising the steps of:

(a) receiving a telephone call from a caller, the telephone call identifying a prepaid account and one of a plurality of content providers;

(b) determining if the caller is authorized to access the content provider and, if the caller is authorized: (i) making a telephone connection between the caller and the identified content provider to enable the content provider to provide a service to the caller through the telephone connection, and (ii) debiting the prepaid account by an amount based on the content provider and the service provided.

13. The method of claim 12 where the received telephone call is a toll-free telephone call.

14. The method of claim 12 where the received telephone call is a collect call.

15. The method of claim 12 where the step of receiving the telephone call includes receiving a caller identifying code corresponding to the prepaid account.

16. The method of claim 12 where the step of receiving the telephone call includes receiving a content provider code identifying the content provider.

17. The method of claim 16 where the content provider code is a telephone number identifying the content provider.

18. The method of claim 16 where the telephone number is a shared-revenue telephone number, and where the step of making the telephone connection includes determining a direct dial telephone number corresponding to the shared-revenue telephone number and calling the direct dial telephone number.

19. The method of claim 12 where the step of receiving the telephone call includes:

(a) informing the caller of the plurality of content providers; and (b) receiving the caller's selection from among the plurality of content providers.

20. The method of claim 12 where the step of determining if the caller is authorized includes determining a balance in the prepaid account.

21. The method of claim 20 where the step of determining if the caller is authorized includes informing the caller of the balance.

22. The method of claim 20 where the caller is determined to be unauthorized if the balance is below a predetermined value.

23. The method of claim 20 where the step of making the telephone connection includes determining a cost for the service.

24. The method of claim 23 where determining the cost includes looking up the cost in a content provider database associating a cost with services.

25. The method of claim 23 where determining the cost includes calculating, based on the balance in the prepaid account and the cost of the service, a maximum duration for the telephone connection.

26. The method of claim 25 further comprising the step of informing the caller of the maximum extent of the telephone connection.

27. The method of claim 12 where the step of determining if the caller is authorized includes checking for a valid caller identifying code.

28. The method of claim 12 further comprising the steps of:

(a) determining, based on the cost of the service and a duration of the telephone connection, when a balance in the prepaid account falls below a predetermined value; and (b) discontinuing the telephone connection when the balance falls below the predetermined value.

29. The method of claim 12 further comprising the steps of:

(a) receiving a payment from the caller; and (b) crediting the prepaid account by an amount based on the payment.

30. The method of claim 12 where the service is a shared-revenue service.

31. A method for providing a service to a caller, the method comprising the steps of:
   (a) registering a service with a transaction processor enabling access to a plurality of content providers via a common access number;
   (b) accepting a telephone connection with a caller having a prepaid account at the transaction processor, the telephone connection having been made via the transaction processor in response to the caller's identification of one of said plurality of content providers via a telephone call to the common access number;
   (c) providing the service to the caller through the telephone connection; and
   (d) receiving a payment for the service from the transaction processor.

32. The method of claim 31 where the service is a shared-revenue service.

33. The method of claim 31 where the common access number is a shared-revenue telephone number.

34. The method of claim 31 where the common access number is a direct dial telephone number.

35. A method for accessing a service offered by a content provider, comprising the steps of:
   (a) making a telephone call to a transaction processor enabling access to a plurality of content providers via a common access number;
   (b) identifying a prepaid account and one of the content providers;
   (c) accepting a telephone connection made by the transaction processor to the identified content provider; and
   (d) receiving a service from the content provider and incurring a debit to the prepaid account by an amount based on the received service.

36. The method of claim 35 where the common access number is a shared-revenue number.

37. The method of claim 35 where the common access number is a direct dial number.

38. The method of claim 37 where the direct dial number is toll-free.

39. The method of claim 35 where making the telephone call includes placing a collect call.

40. The method of claim 35 where the step of identifying the prepaid account includes providing a caller identifying code corresponding to the prepaid account.

41. The method of claim 35 where the step of identifying one of the content providers includes providing a content provider code.

42. The method of claim 41 where the content provider code includes a telephone number which identifies the content provider.

43. The method of claim 35 where the step of identifying one of the plurality of content providers includes:
   (a) receiving identities of the plurality of content providers; and
   (b) selecting one of the plurality of content providers.

44. The method of claim 35 further comprising the step of making a payment to the transaction processor for crediting the prepaid account.

* * * * *